US012651436B2

(12) United States Patent
Ravi Kumar et al.

(10) Patent No.: US 12,651,436 B2
(45) Date of Patent: Jun. 9, 2026

(54) DYNAMIC ADJUSTMENT OF GRID RESOLUTION IN IMAGE PROCESSING

(71) Applicant: QUALCOMM Incorporated, San Diego, CA (US)

(72) Inventors: Varun Ravi Kumar, San Diego, CA (US); Kiran Bangalore Ravi, Paris (FR); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 18/511,592

(22) Filed: Nov. 16, 2023

(65) Prior Publication Data

US 2025/0166354 A1 May 22, 2025

(51) Int. Cl.
| | |
|---|---|
| *G06V 10/77* | (2022.01) |
| *G06V 10/764* | (2022.01) |
| *G06V 10/774* | (2022.01) |
| *G06V 10/80* | (2022.01) |
| *G06V 10/82* | (2022.01) |
| *G06V 20/58* | (2022.01) |

(52) U.S. Cl.
CPC ........ *G06V 10/7715* (2022.01); *G06V 10/764* (2022.01); *G06V 10/80* (2022.01); *G06V 10/82* (2022.01); *G06V 20/58* (2022.01); *G06V 10/7753* (2022.01)

(58) Field of Classification Search
CPC .... G06V 10/7715; G06V 20/58; G06V 10/82; G06V 10/764; G06V 10/80; G06V 10/7753
See application file for complete search history.

(56) References Cited

U.S. PATENT DOCUMENTS

2023/0191998 A1* 6/2023 Schenk .................. G06V 10/82
                                                    348/148
2023/0215026 A1* 7/2023 Du ......................... H04N 23/90
                                                    701/25

OTHER PUBLICATIONS

Liang T., et al., "BEVFusion: A Simple and Robust LiDAR-Camera Fusion Framework", arXiv:2205.13190'73 cs.CV] Nov. 11, 2022, 36th Conference on Neural Information Processing Systems, 2022, 17 Pages.
Verelst T., et al., "SegBlocks: Block-Based Dynamic Resolution Networks for Real-Time Segmentation", arXiv:2011.12025v2 [cs. CV], Aug. 5, 2022, pp. 1-12.
Xie E., et al., "M2BEV: Multi-Camera Joint 3D Detection and Segmentation with Unified Bird's-Eye View Representation", The University of Hong Kong, 2022, pp. 1-21.

* cited by examiner

*Primary Examiner* — David Perlman

(74) *Attorney, Agent, or Firm* — Shumaker & Sieffert, P. A.

(57) ABSTRACT

A method of image processing includes receiving a set of images from a sensor, dynamically determining respective cell resolutions of respective cells in a bird's-eye-view (BEV) grid based on image content in the set of images, wherein at least two of the cells have different cell resolutions, and generating BEV image content based on the respective cell resolutions of the respective cells.

18 Claims, 7 Drawing Sheets

RECEIVE SET OF IMAGES FROM SENSOR                                    400

DYNAMICALLY DETERMINE RESPECTIVE
RESOLUTIONS OF RESPECTIVE CELLS IN BEV GRID
BASED ON IMAGE CONTENT IN SET OF IMAGES             402

GENERATE BEV IMAGE CONTENT BASED ON
RESPECTIVE RESOLUTIONS OF RESPECTIVE CELLS          404

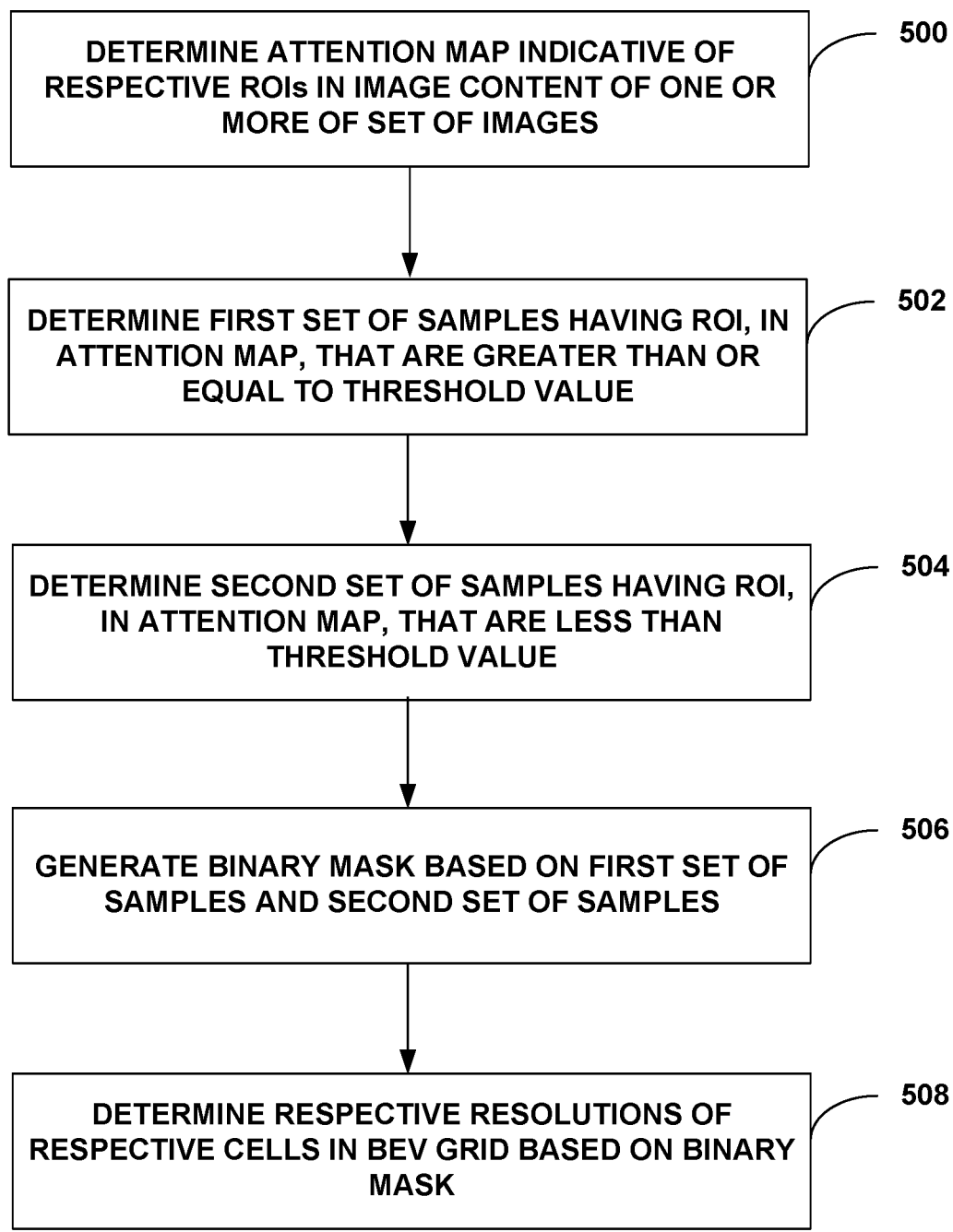

DETERMINE ATTENTION MAP INDICATIVE OF RESPECTIVE ROIs IN IMAGE CONTENT OF ONE OR MORE OF SET OF IMAGES — 500

DETERMINE FIRST SET OF SAMPLES HAVING ROI, IN ATTENTION MAP, THAT ARE GREATER THAN OR EQUAL TO THRESHOLD VALUE — 502

DETERMINE SECOND SET OF SAMPLES HAVING ROI, IN ATTENTION MAP, THAT ARE LESS THAN THRESHOLD VALUE — 504

GENERATE BINARY MASK BASED ON FIRST SET OF SAMPLES AND SECOND SET OF SAMPLES — 506

DETERMINE RESPECTIVE RESOLUTIONS OF RESPECTIVE CELLS IN BEV GRID BASED ON BINARY MASK — 508

FIG. 5

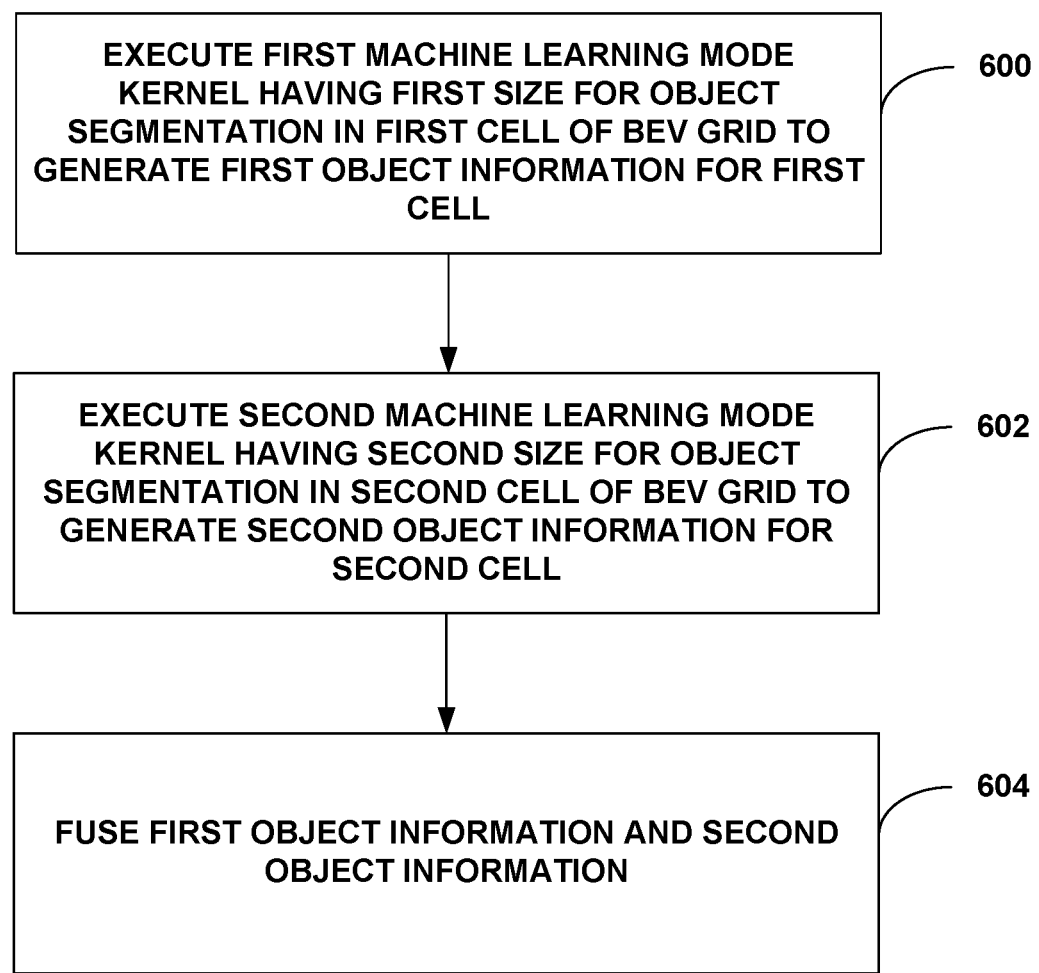

EXECUTE FIRST MACHINE LEARNING MODE KERNEL HAVING FIRST SIZE FOR OBJECT SEGMENTATION IN FIRST CELL OF BEV GRID TO GENERATE FIRST OBJECT INFORMATION FOR FIRST CELL — 600

EXECUTE SECOND MACHINE LEARNING MODE KERNEL HAVING SECOND SIZE FOR OBJECT SEGMENTATION IN SECOND CELL OF BEV GRID TO GENERATE SECOND OBJECT INFORMATION FOR SECOND CELL — 602

FUSE FIRST OBJECT INFORMATION AND SECOND OBJECT INFORMATION — 604

DYNAMIC ADJUSTMENT OF GRID RESOLUTION IN IMAGE PROCESSING

TECHNICAL FIELD

This disclosure relates to grid resolution in image processing.

BACKGROUND

An autonomous driving vehicle is a vehicle that is configured to sense the environment around the vehicle, such as the existence and location of other objects, and operating without human control. An autonomous driving vehicle may include a LiDAR (Light Detection and Ranging) system or other sensor system for sensing point cloud data indictive of the existence and location of other objects around the autonomous driving vehicle. In some examples, such an autonomous driving vehicle may be referred to as an ego vehicle. A vehicle having an advanced driver-assistance system (ADAS) is a vehicle that includes systems which may assist a driver in operating the vehicle, such as parking or driving the vehicle.

SUMMARY

A system (e.g., ADAS, robotics, drones, etc.) may be configured to generate bird's-eye-view (BEV) image content from images captured from one or more sensors in order to make autonomous driving, movement, or other decisions. BEV is an elevated view of an object or location from a steep viewing angle, creating a perspective as if the observer were a bird in flight looking downwards.

This disclosure describes example techniques of dynamically determining respective resolutions of respective cells in a BEV grid based on image content in a set of images from a sensor (e.g., camera or LiDAR). By dynamically determining respective resolutions of respective cells in the BEV grid, processing circuitry of the system may allow for higher resolution in the BEV grid for image content that is relatively thin, and therefore more difficult to segment and identify, but highly impactful for navigation. The higher resolution allows the processing circuitry to more accurately determine navigation functionality because image content in the higher resolution can be better segmented and identified. Moreover, by having different resolutions for cells in the BEV grid (e.g., based on image content), there may be an improvement in real-time memory consumption and computational efficiencies.

In one example, the disclosure describes a method of image processing, the method comprising: receiving a set of images from a sensor; dynamically determining respective cell resolutions of respective cells in a bird's-eye-view (BEV) grid based on image content in the set of images, wherein at least two of the cells have different cell resolutions; and generating BEV image content based on the respective cell resolutions of the respective cells.

In one example, the disclosure describes a system for image processing, the system comprising: one or more memories; and processing circuitry coupled to the one or more memories, wherein the processing circuitry is configured to: receive a set of images from a sensor; dynamically determine respective cell resolutions of respective cells in a bird's-eye-view (BEV) grid based on image content in the set of images, wherein at least two of the cells have different cell resolutions; and generate BEV image content based on the respective cell resolutions of the respective cells.

In one example, the disclosure describes computer-readable storage media comprising instructions that when executed cause one or more processors to: receive a set of images from a sensor; dynamically determine respective cell resolutions of respective cells in a bird's-eye-view (BEV) grid based on image content in the set of images, wherein at least two of the cells have different cell resolutions; and generate BEV image content based on the respective cell resolutions of the respective cells.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating an example method of generating a mask for determining respective resolutions of respective cells in a BEV grid.

FIG. 6 is a flowchart illustrating an example method of segmentation and fusing.

FIG. 7 is a conceptual diagram illustrating an example of a BEV grid with cells having different resolutions.

DETAILED DESCRIPTION

Figure 1:
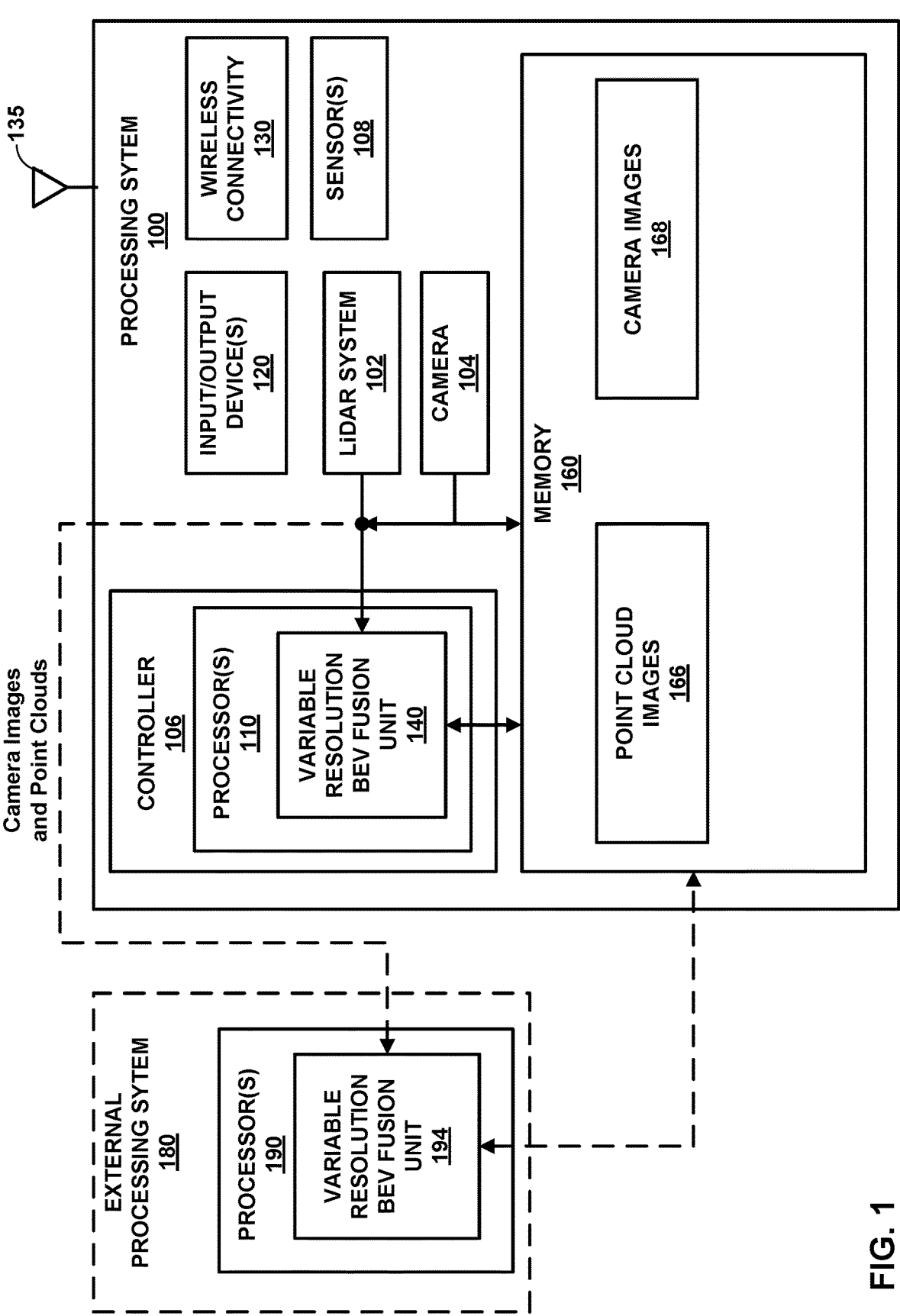
FIG. 1 is a block diagram illustrating an example processing system according to one to more aspects of this disclosure.

Various example systems utilize image content captured from one or more sensors, and may use example techniques described in this disclosure. As some examples, robotic systems, drones, advanced driver assistance system (ADAS), etc. may utilize the example techniques described in this disclosure. For ease, the examples are described with respect to ADAS.

An ADAS uses image content captured from one or more sensors for assisting a driver in various driving scenarios. For instance, the ADAS may receive images from one or more sensors, extract and aggregate features from the images, and generate BEV features. For instance, for images captured by a camera, the ADAS may perform a perspective view (PV) to BEV projection to generate the camera BEV features, or flatten the projection for images captured by a LiDAR system to generate LiDAR BEV features. In one or more examples, BEV representation functions well for tracking and predicting object movement, and therefore BEV representation is well suited for navigation functionality.

However, not all objects can be represented or detected well in the BEV space. For instance, traffic signs and pedestrians may not be represented or detected well. This may be due to certain objects, like traffic signs and pedestrians, being relatively thin in the BEV For example, the BEV image content may be arranged as a BEV grid (e.g., 128×128 pixels). This BEV grid may include a plurality of cells, and each cell may include a range of 80 cm. Accordingly, a person or sign may be allocated relatively small amount of area in the BEV grid. Moreover, the image content from the one or more sensors tends to become sparser the further away the object is. For instance, a far away pedestrian may be one pixel in the BEV space.

In some techniques, the resolution of each cell is constant. Resolution refers to the number of pixels that are allocated to represent an area. For instance, high resolution means that there are more pixels to represent a unit area, and low resolution means that there are fewer pixels to represent a unit area. If the resolution of each cell is constant, then relatively thin objects, in BEV, may be given the same number of pixels for rendering as compared to wider objects. This may result in not enough pixels being allocated for relatively thin objects, resulting in poorer segmentation and identification, while wider objects, in BEV, that may be relatively easy to segment and identify are allocated more pixels than needed for segmentation and identification. It may be possible to allocate relatively high resolution throughout the entire BEV grid, but allocating high resolution throughout the entire BEV grid may be computationally and memory inefficient for real-time use like navigation functionality.

This disclosure describes example techniques of dynamically determining the resolution of cells in BEV grid for generating BEV image content. For example, processing circuitry (e.g., of an ADAS system or other system) may receive a set of images from a sensor (e.g., camera or LiDAR) and dynamically determine respective resolutions of respective cells in a bird's-eye-view (BEV) grid based on image content in the set of images. In this disclosure, "dynamically" may refer to run-time (e.g., during operation). That is, the cell resolution of the cells in the BEV grid may have an initial resolution, and the processing circuitry, during run-time, may update the resolution, or more generally, determine the cell resolutions even if there is no initial resolution.

In some examples, the techniques described in this disclosure may be performed by machine learning (ML)/artificial intelligence (AI) techniques, generally referred to as deep learning, utilizing one or more neural networks. The term "dynamically" may refer to the processing circuitry performing the example techniques during or shortly before the inference time of the neural networks (e.g., during or shortly before execution of the neural networks). For instance, the processing circuitry may dynamically determine the respective cell resolutions of respective cells based on the images that are captured on which the neural network will execute for controlling the vehicle.

In one or more example, at least two of the cells have different resolutions (e.g., not all cells have the same fixed resolution). The processing circuitry may generate BEV image content based on the respective resolutions of the respective cells.

In one or more examples, the processing circuitry may determine resolution of the cells in the BEV grid based on the image content. For instance, the processing circuitry may be configured to determine regions of interest (ROIs). As an example, salient portions in the image content (e.g., portions that tend to attract viewer gaze) may be examples of ROIs. In one or more examples, the processing circuitry may determine an attention map indicative of ROIs in the image content of one or more of the set of images, and dynamically determine the respective cell resolutions based on the attention map.

The processing circuitry may determine which samples having ROI values, in the attention map, that are greater than or equal to a threshold value, and generate a binary mask based on the samples having ROI values that are greater than or equal to the threshold value. The processing circuitry may dynamically determine the respective cell resolutions based on the binary mask.

The processing circuitry may execute a neural network model (e.g., pretrained using unlabeled training images) to generate the attention map. For example, the processing circuitry, with execution of the neural network model, may be determine an object type of objects in the image content. The processing circuitry may dynamically determine respective cell resolutions of respective cells in the BEV grid based on the object type of objects in the image content in the set of images.

Moreover, because the cell resolutions of the cells in the grid may be different, it may be possible for the processing circuitry to execute different sized kernels for generating the BEV image content. For example, the processing circuitry may execute a first machine learning model kernel having a first size for object segmentation in a first cell of the cells in the BEV grid to generate first object information for the first cell, and execute a second machine learning model kernel having a second size for object segmentation in a second cell of the cells in the BEV grid to generate second object information for the second cell. The processing circuitry may then fuse the first object information and the second object information to generate the BEV image content.

FIG. 1 is a block diagram illustrating an example processing system according to one to more aspects of this disclosure. Processing system 100 may be part of a robotics system, drone system, or other systems that use image content for predicting motion. For ease of description, the examples are described with processing system 100 being used in a vehicle, such as an autonomous driving vehicle or an assisted driving vehicle (e.g., a vehicle having an ADAS or an "ego vehicle"). In such an example, processing system 100 may represent an ADAS. As mentioned, in other examples, processing system 100 may be used in other robotic applications that may include one or more sensors. Although described with respect to ADAS, the example techniques may be applicable for other systems as well.

In the example of FIG. 1, the one or more sensors of processing system 100 include LiDAR system 102, camera 104, and sensors 108. For ease of illustration and description, the example techniques are described with respect to LiDAR system 102 and camera 104. However, the example techniques may be applicable to examples where there is one sensor. The example techniques may also be applicable to examples where different sensors are used in addition to or instead of LiDAR system 102 and camera 104.

Processing system 100 may also include controller 106, input/output device(s) 120, wireless connectivity component 130, and memory 160. LiDAR system 102 may include one or more light emitters (e.g., lasers) and one or more light sensors. LiDAR system 102 may be deployed in or about a vehicle. For example, LiDAR system 102 may be mounted on a roof of a vehicle, in bumpers of a vehicle, and/or in other locations of a vehicle. LiDAR system 102 may be configured to emit light pulses and sense the light pulses reflected off of objects in the environment. LiDAR system 102 may emit such pulses in a 360 degree field around so as to detect objects within the 360 degree field, such as objects in front of, behind, or beside a vehicle. While described herein as including LiDAR system 102, it should be understood that another distance or depth sensing system may be used in place of LiDAR system 102. The output of LiDAR system 102 are called point clouds or point cloud frames.

A point cloud frame output by LiDAR system 102 is a collection of 3D data points that represent the surface of objects in the environment. These points are generated by measuring the time it takes for a laser pulse to travel from the sensor to an object and back. Each point in the cloud has at least three attributes: x, y, and z coordinates, which represent its position in a Cartesian coordinate system. Some LiDAR systems also provide additional information for each point, such as intensity, color, and classification.

Intensity (also called reflectance) is a measure of the strength of the returned laser pulse signal for each point. The value of the intensity attribute depends on various factors, such as the reflectivity of the object's surface, distance from the sensor, and the angle of incidence. Intensity values can be used for several purposes, including distinguishing different materials, and enhancing visualization. Intensity values can be used to generate a grayscale image of the point cloud, helping to highlight the structure and features in the image content of a scene.

Color information in a point cloud is usually obtained from other sources, such as digital cameras (e.g., camera 104) mounted on the same platform as the LiDAR sensor, and then combined with the LiDAR data, as described in more detail. The color attribute consists of color values (e.g., red, green, and blue (RGB)) values for each point. The color values may be used to improve visualization and aid in enhanced classification (e.g., the color information can aid in the classification of objects and features in the scene, such as vegetation, buildings, and roads.)

Classification is the process of assigning each point in the point cloud to a category or class based on its characteristics or its relation to other points. The classification attribute may be an integer value that represents the class of each point, such as ground, vegetation, building, water, etc. Classification can be performed using various algorithms, often relying on machine learning techniques or rule-based approaches.

Camera 104 may be any type of camera configured to capture video or image data in the scene (e.g., environment) around processing system 100 (e.g., around a vehicle). For example, camera 104 may include a front facing camera (e.g., a front bumper camera, a front windshield camera, and/or a dashcam), a back facing camera (e.g., a backup camera), side facing cameras (e.g., cameras mounted in sideview mirrors). Camera 104 may be a color camera or a grayscale camera. In some examples, camera 104 may be a camera system including more than one camera sensor. While techniques of this disclosure will be described with reference to a 2D photographic camera, the techniques of this disclosure may be applied to the outputs of other sensors that capture information at a higher frame rate than a LiDAR sensor, including examples of the one or more sensors 108, such as a sonar sensor, a radar sensor, an infrared camera, and/or a time-of-flight (ToF) camera.

Wireless connectivity component 130 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 130 is further connected to one or more antennas 135.

Processing system 100 may also include one or more input and/or output devices 120, such as screens, touch-sensitive surfaces (including touch-sensitive displays), physical buttons, speakers, microphones, and the like. Input/output device(s) 120 (e.g., which may include an I/O controller) may manage input and output signals for processing system 100. In some cases, input/output device(s) 120 may represent a physical connection or port to an external peripheral. In some cases, input/output device(s) 120 may utilize an operating system. In other cases, input/output device(s) 120 may represent or interact with a modem, a keyboard, a mouse, a touchscreen, or a similar device. In some cases, input/output device(s) 120 may be implemented as part of a processor (e.g., a processor of processor(s) 110). In some cases, a user may interact with a device via input/output device(s) 120 or via hardware components controlled by input/output device(s) 120.

Controller 106 may be an autonomous or assisted driving controller (e.g., an ADAS) configured to control operation of processing system 100 (e.g., including the operation of a vehicle). For example, controller 106 may control acceleration, braking, and/or navigation of the vehicle through the scene (e.g., environment surrounding the vehicle). Controller 106 may include one or more processors, e.g., processor(s) 110. Processor(s) 110 may include one or more central processing units (CPUs), such as single-core or multi-core CPUs, graphics processing units (GPUs), digital signal processor (DSPs), neural processing unit (NPUs), multimedia processing units, and/or the like. Instructions executed by processor(s) 110 may be loaded, for example, from memory 160 and may cause processor(s) 110 to perform the operations attributed to processor(s) 110 in this disclosure. In some examples, one or more of processor(s) 110 may be based on an ARM or RISC-V instruction set.

An NPU is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

Processor(s) 110 may also include one or more sensor processing units associated with LiDAR system 102, camera 104, and/or sensor(s) 108. For example, processor(s) 110 may include one or more image signal processors associated with camera 104 and/or sensor(s) 108, and/or a navigation processor associated with sensor(s) 108, which may include satellite-based positioning system components (e.g., GPS or GLONASS) as well as inertial positioning system components. In some aspects, sensor(s) 108 may include direct depth sensing sensors, which may function to determine a depth of or distance to objects within the environment surrounding processing system 100 (e.g., surrounding a vehicle).

Processing system 100 also includes memory 160, which is representative of one or more static and/or dynamic memories, such as a dynamic random access memory, a flash-based static memory, and the like. In this example, memory 160 includes computer-executable components, which may be executed by one or more of the aforementioned components of processing system 100.

Examples of memory 160 include random access memory (RAM), read-only memory (ROM), or a hard disk. Examples of memory 160 include solid state memory and a hard disk drive. In some examples, memory 160 is used to store computer-readable, computer-executable software including instructions that, when executed, cause a processor to perform various functions described herein. In some cases, memory 160 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 160 store information in the form of a logical state.

As illustrated, processor(s) 110 may include variable resolution BEV fusion unit 140. Variable resolution BEV fusion unit 140 may be fixed-function circuitry, may be programmable circuitry on which software can execute to perform the functions of variable resolution BEV fusion unit 140, or a combination thereof. Variable resolution BEV fusion unit 140 may be configured to perform example techniques described in this disclosure of dynamically determining respective cell resolutions of respective cells in a BEV grid based on image content in a set of images from a sensor (e.g., camera 104 and LiDAR system 102).

In the example of FIG. 1, memory 160 stores point cloud images 166 and camera images 168. Point cloud images 166 refer to the raw sensor data from LiDAR system 102, and camera images 168 refer to the raw sensor data from camera 104. Again, it may be possible to use one, both, other, or additional raw sensor data than point cloud images 166 and camera images 168.

One or more processors 110 may access point cloud images 166 and camera images 168 from memory 160 and process point cloud images 166 and camera images 168 to generate point cloud feature data and camera image feature data. One or more processors 110 may be configured to utilize the point cloud feature data and the camera image feature data to generate BEV image content. For instance, for point cloud images 166, one or more processors 110 may flatten projection of the 3D feature data to generate LiDAR BEV features. Camera images 168 may be considered as being in perspective view (PV). One or more processors 110 may project the perspective view to the BEV to generate camera BEV features.

In generating the LiDAR BEV features and the camera BEV features, one or more processors 110 may be configured to generate a BEV grid (e.g., one BEV grid for LiDAR and another BEV grid for camera). The BEV grid includes a plurality of cells, and each cell may be configured to represent a certain area. In some techniques, the cell resolution of the cells in the BEV grid is constant. This results in all objects receiving the same number of pixels for a given area.

However, there may be some issues with having all cells within the BEV grid with the same cell resolution. For instance, the LiDAR BEV features and the camera BEV features are used by processing system 100 to control operation of a vehicle. As an example, controller 106 may cause the vehicle to speed, slow down, swerve, etc. based on objects in the image content captured by camera 104 and LiDAR system 102.

If the cell resolution of the cells is constant throughout the entire BEV grid, then feature data for relatively thin objects, especially in BEV perspective such as humans or poles, may be lacking, but feature data for relatively wider objects is preserved. In such cases, processing system 100 may suboptimally determine vehicle operation because feature data for relatively thin objects is lacking (e.g., missing or incomplete).

In one or more examples described in this disclosure, variable resolution BEV fusion unit 140 may be configured to dynamically determine respective cell resolutions of respective cells in a BEV grid based on image content in the set of images from a sensor (e.g., point cloud images 166 and/or camera images 168). In such examples, at least two of the cells have different cell resolutions. Variable resolution BEV fusion unit 140 may be configured to generate BEV image content based on the respective cell resolutions of the respective cells.

As an example, variable resolution BEV fusion unit 140 may be configured to dynamically adjust a cell resolution of a cell of the BEV grid based on the presence of specific objects. For instance, variable resolution BEV fusion unit 140 may be configured to determine ROIs in point cloud images 166 and/or camera images 168, where the ROIs represent salient regions or regions that include objects having a particular object type (e.g., pedestrian or light pole).

Variable resolution BEV fusion unit 140 may be configured to dynamically adjust the cell resolutions such that regions with higher ROIs are given additional resolution (e.g., more samples are allocated to a certain area) and regions with lower ROIs are given lower resolution or no change in resolution. As noted above, a cell having a higher cell resolution may mean that more samples are allocated to that cell. By allocating more samples to that cell, the size of the image content is not changed, but the features of the image content in that cell are more readily determinable. For instance, assume that there are two cells having different cell resolutions. For a same object, in both cells, the size of the object is the same. However, in the cell having the higher resolution, the features of the object are more prominent than in the cell having the lower resolution.

This is because more samples are allocated to the cell having the higher resolution, the object type, curvature, segmentation, etc. can be more easily determined. For example, part of the operation of variable resolution BEV fusion unit 140 may be segmentation of the image content so that it is clear where the road is and where a pedestrian is. By allocating additional samples of cells that having the pedestrian (e.g., by having higher cell resolution), variable resolution BEV fusion unit 140 may accurately segment the pedestrian and the road as compared to if the cell had lower resolution.

Variable resolution BEV fusion unit 140 may generate BEV image content (e.g., segmentation data, feature data, etc.) based on the respective cell resolutions. In one or more examples, because the cell resolutions of the cells may be different, it may be possible to utilize machine learning model kernels having different sizes for object segmentation, and then fusing the resulting object information from execution of machine learning model kernels, as described in more detail.

In some examples, external processing system 180 may be configured to perform the example techniques described in this disclosure. For instance, external processing system 180 includes one or more processors 190 that include variable resolution BEV fusion unit 194. One or more processors 190 may be similar to one or more processors 110 and variable resolution BEV fusion unit 194 may be similar to variable resolution BEV fusion unit 140. For instance, as illustrated, in some examples, variable resolution BEV fusion unit 194 may receive point cloud image 166 and camera images 168 and may perform operations similar to those described above for variable resolution BEV fusion unit 140.

Figure 2:
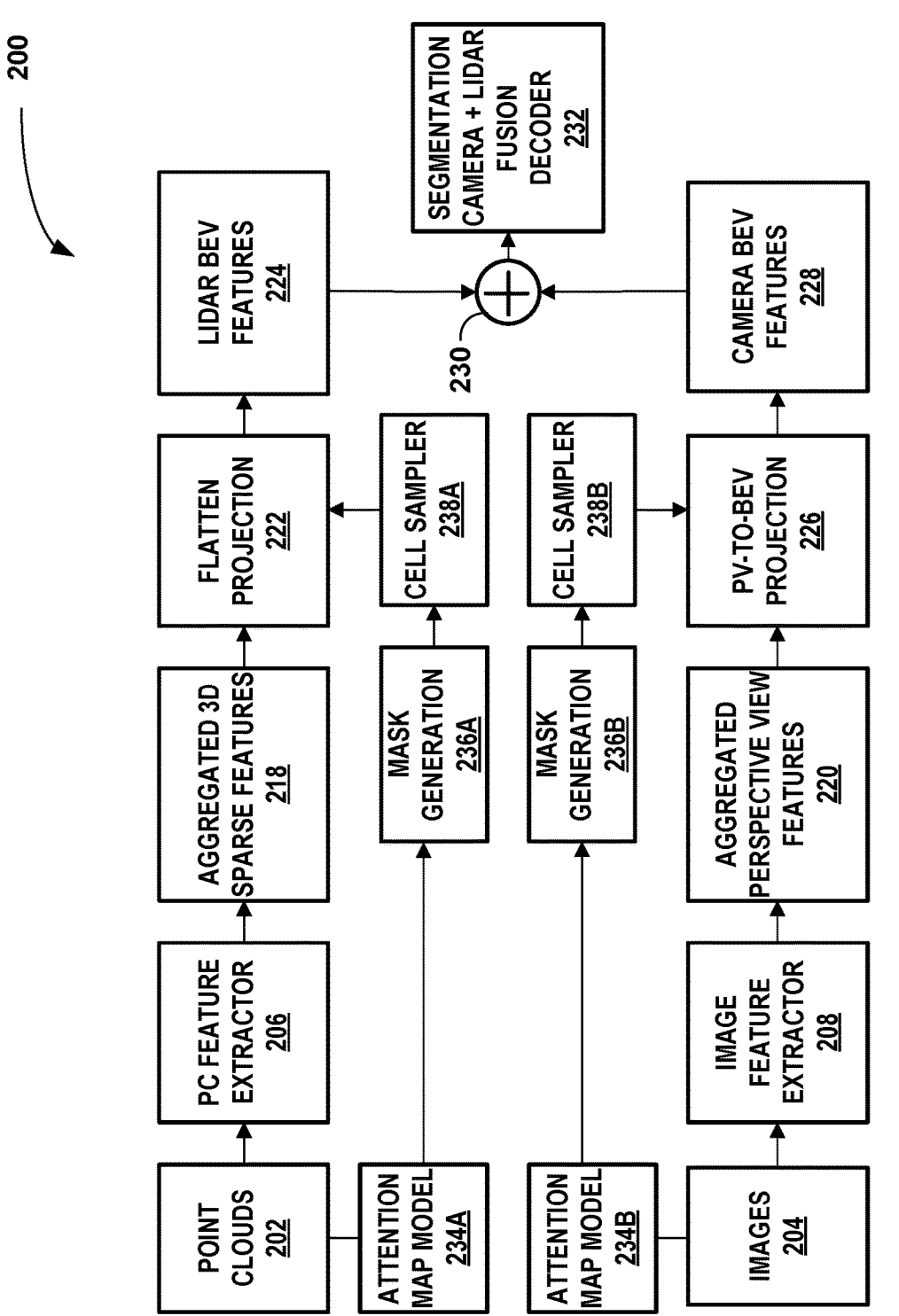
FIG. 2 is a block diagram illustrating an example process dynamic determination of resolutions of cells in a bird's-eye-view (BEV) grid.

FIG. 2 is a block diagram illustrating an example process dynamic determination of resolutions of cells in a bird's-eye-view (BEV) grid. For instance, FIG. 2 illustrates an example of variable resolution BEV fusion unit 200, which is an example of variable resolution BEV fusion unit 140 or variable resolution BEV fusion unit 194 of FIG. 1. Variable resolution BEV fusion unit 200 may also be referred to as a region-simply-refine module. For instance, the example units of variable resolution BEV fusion unit 200 may be fixed-function circuitry or may be programmable units that execute on one or more processors 110 or 190. For ease of illustration, variable resolution BEV fusion unit 200 of FIG. 2 is described with respect to one or more processors 110, but may be performed by one or more processors 190 or the example techniques may be performed by a combination of one or more processors 110 and one or more processors 190.

In the example of FIG. 2, one or more processors 110 acquire point clouds (202) and acquires images (204). The point clouds and images may constitute raw data acquired by sensors, such as LiDAR system 102 and camera 104, respectively.

As illustrated, variable resolution BEV fusion unit 200 may include attention map model 234A and 234B. Attention map model 234A and 234B may be configured to determining an attention map indicative of respective regions of interest (ROIs) in the image content of one or more of the set of images (e.g., point clouds 202 or images 204, respectively). Attention map model 234A and 234B may be configured to classify a cell as high resolution or low resolution, and may be referred to as a self-attention block. Attention map model 234A and 234B may be configured to determine an object type of objects in the image content, in some examples.

In some examples, attention map model 234A and 234B may each be a neural network model that is configured to assign higher weights to specific cells where objects like pedestrians or traffic lights. In general, one or more processors 1100 may utilize the ROIs and/or the object types as ways in which to dynamically determine respective cell resolutions, such as by focusing (e.g., having increased resolution) on the highlighted regions (e.g., the regions with relatively high ROI).

The neural network model that forms attention map model 234A and/or 234B may be pretrained on a large dataset of unlabeled training images. The unlabeled training images may not require any annotations. For instance, during training, the neural network model learns to capture meaningful spatial relationships and patterns in the training images. The attention mechanism learns to attend to salient regions based on the inherent structure and characteristics of the training images.

Once attention map model 234A and/or 234B are pretrained, one or more processors 110 may use attention map model 234A and/or 234B to generate attention maps indicative of respective ROIs in the image content of one or more of the set of images. For instance, the attention map highlights the regions that attention map model 234A and/or 234B deem important or relevant. Accordingly, in one or more examples, to determine an attention map, one or more processors 110 may determine, based on executing an attention map model (e.g., attention map model 234A and/or 234B), the attention map, where the attention map model 234A and/or 234B is pretrained using unlabeled training images.

In addition, as part of variable resolution BEV fusion unit 200, one or more processors 110 perform point-cloud feature extraction (206) on the acquired point clouds and perform image features extraction (208) on the acquired images. One or more processors 110 may, for example, identify shapes, lines, or other features in the point clouds and images that may correspond to real-world objects of interest. Performing feature extraction on the raw data may reduce the amount of data in the frames as some information in the point clouds and images may be removed. For example, data corresponding to unoccupied voxels of a point cloud may be removed.

One or more processors 110 may store a set of aggregated 3D sparse features (218). That is, one or more processors 110 may maintain a buffer with point cloud frames. The point clouds in the buffer, due to feature extraction and/or down sampling, may have reduced data relative to the raw data acquired by LiDAR system 102. One or more processors 110 may add new point clouds to the buffer at a fixed frequency and/or in response to processing system 100 having moved a threshold unit of distance.

One or more processors 110 may store a set of aggregated perspective view features (220). That is, one or more processors 110 may maintain a buffer with sets of images. The images in the buffer, due to feature extraction and/or down sampling, may have reduced data relative to the raw data acquired by camera 104. One or more processors 110 may add new images to the buffer at a fixed frequency and/or in response to processing system 100 having moved a threshold unit of distance.

As illustrated, mask generation 236A receives the attention map from attention map model 234A. Mask generation 236B receives the attention map from attention map model 234B. Mask generation 236A and mask generation 236B may be configured to perform thresholding or post-processing. For instance, mask generation 236A and 236B may set a threshold value, above which the attention map samples are considered as regions of interest. By thresholding the attention map, mask generation 236A and 236B may generate binary masks that indicate the presence or absence of objects in different regions of the image. One or more processors 110 may utilize the binary mask to dynamically determine if high-resolution or low-resolution operations are applied.

As an example, one or more processors 110 may determine a first set of samples having ROI values, in the attention map, that are greater than or equal a threshold value, and determine a second set of samples having ROI values, in the attention map, that are less than the threshold value. One or more processors 110 may generate a binary mask based on the first set of samples and the second set of samples. For instance, one or more processors 110 may assign a value of one to the samples having ROI values greater than or equal to the threshold value, and assign a value of zero to the samples having ROI values less than the threshold value. The assigned ones and zeros for the samples may be the binary mask.

One or more processors 110 may be configured to determine respective cell resolutions of cells in the BEV grid based on the image content in the set of images. For instance, one or more processors 110 may be configured to determine respective cell resolutions of cells in the BEV grid from the attention map(s) generated by attention map model 234A and/or 234B. As one example way in which to use the attention maps, mask generation 236A and 236B may each generate a binary mask, and one or more processors 110 may use the binary mask to determine respective cell resolutions. The use of a binary mask is not necessary in all examples.

As one example, camera-based masks (e.g., binary mask from mask generation 236B) may focus (e.g., high resolution cells) on edges of FOV (field of view) for road, objects in the center (e.g., assuming relative high ROI value as determined by attention map model 234B). LIDAR based masks (e.g., binary mask from mask generation 236A) may defocus (e.g., low resolution cells) on regions where point cloud density is low (e.g., assuming relative low ROI value as determined by attention map model 234A).

In the example of FIG. 2, cell sampler 238A and cell sampler 238B may be configured to determine the respective cell resolutions of respective cells in the BEV grid. For instance, in ROIs where the attention map and/or binary mask indicates has a high probability of containing objects like pedestrians (e.g., such as where mask is one), cell sampler 238A and/or cell sampler 238B (e.g., of one or more processors 110) may be configured to set the cell resolution of the corresponding cells in the BEV to a higher resolution. In cells where the proposed grid has a low probability (e.g., such as where the mask is zero), cell sampler 238A and/or cell sampler 238B (e.g., of one or more processors 110) may be configured to set the cell resolution of the corresponding cells in the BEV grid is to a lower resolution. This adaptive adjustment of grid resolution allows for more accurate and detailed segmentation of objects in the BEV space, while reducing computation for regions without objects or where is low region of interest.

One or more processors 110 may flatten projection (222) on the point cloud frames, e.g., on the aggregated 3D sparse features. One or more processors 110 may perform perspective view (PV)-to-BEV projection (226) on the images, e.g., the aggregated perspective view features. In one or more examples, to flatten projection on the point cloud frames, one or more processors 110 may flatten projection on the point cloud frames based the cell resolutions that cell sampler 238A dynamically determined. Similarly, one or more processors 110 may perform PV-to-BEV projection on the images based on the cell resolutions that cell sampler 238B dynamically determined. In this way, the BEV image content for areas with object types of greater interest and that can be relatively thin in the BEV are given higher cell resolution, and the BEV image content for areas with object types of lesser interest are given lower cell resolution.

Flatten projection converts the 3D point cloud data into 2D data, which creates a birds-eye-view (BEV) perspective of the point cloud, e.g., data indicative of LiDAR BEV features 224 in the point clouds. PV-to-BEV projection converts the image data into 2D BEV data, using for example matrix multiplication, which creates data indicative of camera BEV features (228).

As illustrated in FIG. 2, one or more processors 110 may combine (230) LiDAR BEV features 224 and camera BEV features 228, and output the result to segmentation camera+LiDAR fusion decoder 232 (or simply decoder 232). As described above, the cell resolutions for cells in the LiDAR BEV grid may be different and the cell resolutions of cells in the camera BEV grid may be different. In some examples, one or more processors 110 may utilize decoder 232 to subsample the low-resolution cells and then operate on by DNN filters, while high resolution cells are operated on directly. Decoder 232 may then up-sample (cell combine) to match the spatial resolution of the high-resolution cells.

For example, once the cell resolution is adjusted based on the proposed regions, decoder 232 may perform a semantic segmentation task using convolutional neural networks (CNNs) on the BEV grid (e.g., the combined BEV grid from LiDAR BEV features 224 and camera BEV features 228). That is, decoder 232 may be a CNN that is used to perform semantic segmentation. Because the cell resolutions of the cells are different, it may be possible for decoder 232 to utilize different sized machine learning model kernels.

To achieve the utilization of simpler convolutional kernels for BEV features in cells with lower resolution while maintaining segmentation accuracy segmentation as in cells with higher resolution, decoder 232 may employ adaptive kernel sizes based on the resolution of the BEV grid cells. This may enable efficient computation while preserving segmentation performance. For example, in traditional CNN architectures, the same convolutional kernel size is applied across the entire image or feature map. However, one or more examples, decoder 232 may utilize adaptive kernel sizes that vary based on the resolution of the BEV grid cells.

As one example, for cells with higher resolution, which correspond to regions of interest, smaller machine learning model kernel sizes can be used to capture fine-grained details. These smaller machine learning model kernels can help the CNNs capture more intricate features associated with pedestrians or other objects. For cells with lower resolution, larger machine learning model kernel sizes can be employed. These larger machine learning model kernels allow for more efficient computation and are sufficient to capture the broader context and features of objects that are farther away or less detailed. The use of larger machine learning model kernel sizes may be an example way in which the one or more processors 110 may be considered as downsampling the BEV image content of low resolution cells.

For example, the respective cells in the BEV grid may include a first cell having a first cell resolution and a second cell having a second cell resolution. In this example, the first cell resolution is greater than the second cell resolution. To generate the BEV image content, one or more processors 110 may be configured to execute a first machine learning model kernel having a first size for object segmentation in the first cell to generate first object information for the first cell, and execute a second machine learning model kernel having a second size for object segmentation in the second cell to generate second object information for the second cell. In this example, the first size is smaller than the second size.

To ensure that information from different resolutions is effectively incorporated, decoder 232 may employ a multi-scale feature fusion approach. For instance, in the multi-scale feature fusion approach, which is an example way in which decoder 232 may combine the different resolution, decoder 232 may combine features extracted using different kernel sizes at multiple resolutions. For instance, for cells with higher resolution, features extracted using smaller kernel sizes can be utilized. These features capture detailed information specific to the region of interest. For cells with lower resolution, features extracted using larger kernel sizes are used. Although these features are less detailed, they still provide relevant contextual information about the surrounding environment. Decoder 232 may fuse the features from different resolutions using appropriate techniques, such as concatenation or element-wise summation, to create a comprehensive representation that captures both fine-grained details and contextual information.

Figure 3:
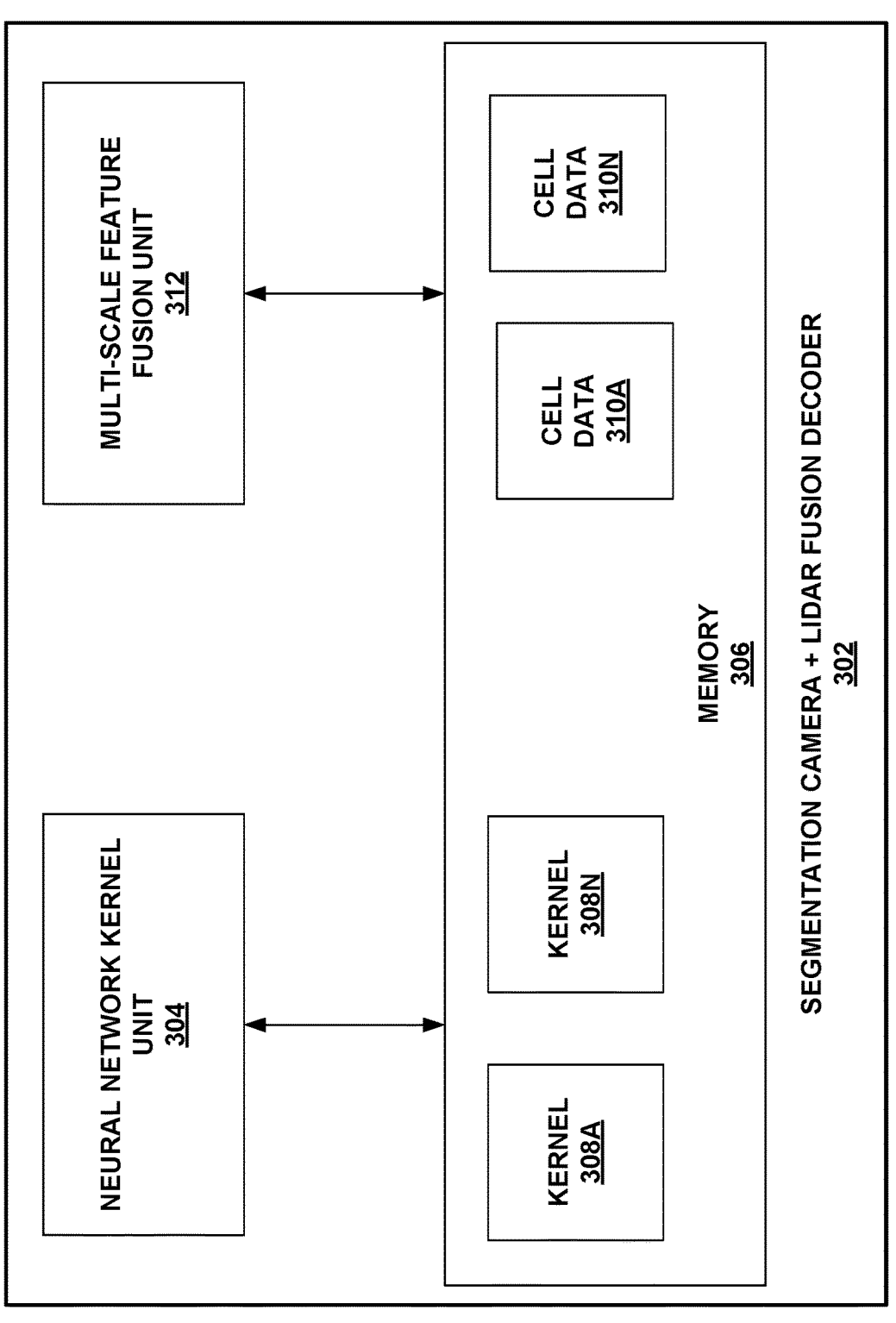
FIG. 3 is a block diagram illustrating an example of segmentation decoder.

FIG. 3 is a block diagram illustrating an example of segmentation decoder. For instance, FIG. 3 illustrates segmentation camera+LiDAR fusion decoder 302 (or simply decoder 302), which is an example of decoder 232 of FIG. 2.

As illustrated, decoder 302 include neural network kernel unit 304, memory 306 that stores machine learning model kernels 308A-308N and cell data 310A-310N, and multi-scale feature fusion unit 312. Machine learning model kernels 308A-308N may be different sized machine learning model kernels that are executable by one or more processors 110.

In FIG. 3, the adaptive kernel sizes and multi-scale feature fusion are incorporated into the segmentation network architecture of decoder 302. For instance, decoder 302 receives inputs from the BEV grid, and the convolutional layers of decoder 302 within the network adaptively select the appropriate kernel sizes based on the resolution of the input cells.

As one example, neural network kernel unit 304 may receive the BEV grid and determine the size of the machine learning model kernel based on the cell resolutions of the cells of the BEV grid. For instance, neural network kernel unit 304 may select one of machine learning model kernels 308A-308N, each having a different size.

Neural network kernel unit 304 may then execute the selected one of the machine learning model kernels 308A-308N, and store the result as cell data 310A-310N. For example, assume that the respective cells in the BEV grid include a first cell having a first cell resolution and a second cell having a second cell resolution. The first cell resolution is greater than the second cell resolution. In this example, neural network kernel unit 304 may execute a first machine learning model kernel 308A having a first size for object segmentation in the first cell to generate first object information (e.g., cell data 310A) for the first cell, and execute a second machine learning model kernel 308N having a second size for object segmentation in the second cell to generate second object information (e.g., cell data 310N) for the second cell. In this example, the first size is smaller than the second size.

Multi-scale feature fusion unit 312 may be configured to fuse the first object information and the second object information. For example, multi-scale feature fusion unit 312 may be configured to perform concatenation or element-wise summation, or some other fusion technique to fuse cell data 310A and cell data 310N. The result may be the BEV image content that is generated based on the respective cell resolutions of the respective cells of the BEV grid.

By utilizing adaptive kernel sizes and multi-scale feature fusion, decoder 302 may effectively process cell with varying resolutions while maintaining segmentation accuracy. This approach may optimize the computation required for cells with lower resolution while ensuring that important details are captured in cells with higher resolution. By dynamically adjusting the kernel sizes based on the cell resolution, decoder 302 can adaptively capture relevant features and achieve efficient semantic segmentation in the BEV space.

For instance, the semantic segmentation may be information that indicates the contours of the objects, where one object ends and another object begins, etc. With the example techniques described in this disclosure semantic segmentation may be improved because the features of objects of interest (e.g., having relatively high ROI values) are generated with relatively higher resolution, and therefore the separation of the objects can be more easily determined and determined more accurately.

As described, in one or more examples, processing system 100 may be configured to control operation of a vehicle based on the BEV image content. For example, processing system 100 may slow down, speed up, brake, flash warning, provide recommendation, swerve, etc. the vehicle based on the BEV image content.

Figure 4:
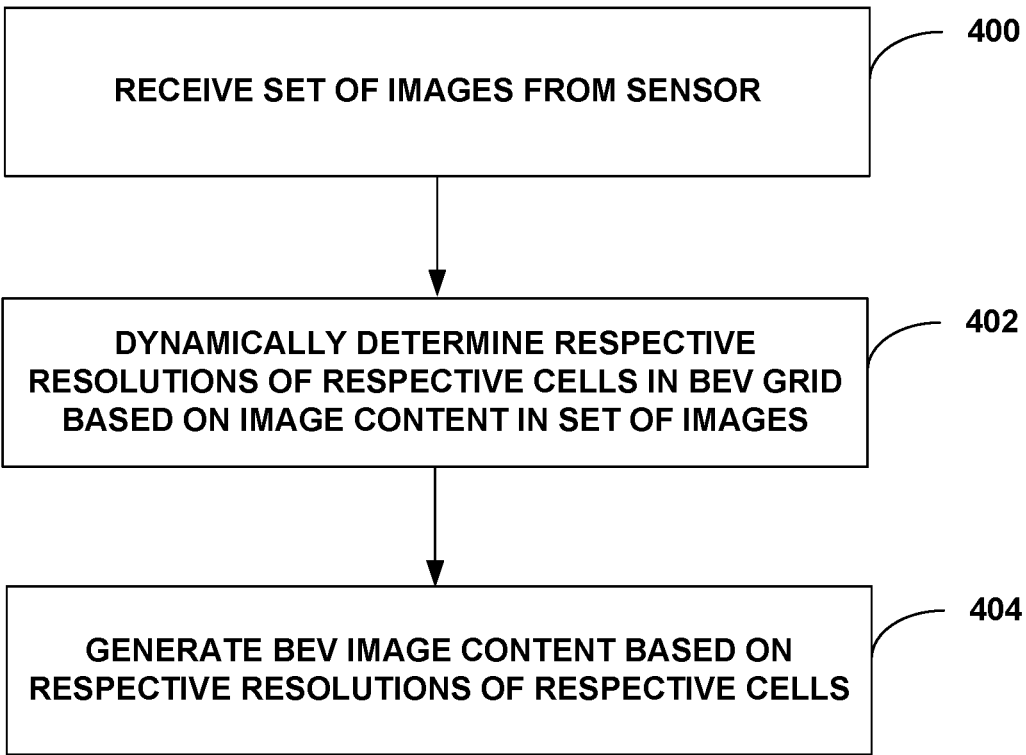
FIG. 4 is a flowchart illustrating an example process of dynamically determining respective resolutions of respective cells in a BEV grid.

FIG. 4 is a flowchart illustrating an example process of dynamically determining respective resolutions of respective cells in a BEV grid. For ease, the examples are described with respect to one or more processors 110, but the example techniques may be performed by one or more processors 110, one or more processors 190, or any combination thereof.

As one example, one or more processors 110 may be configured to receive a set of images from a sensor (400). The sensor is one of a camera or a LiDAR.

One or more processors 110 may be configured to dynamically determine respective resolutions of respective cells in BEV grid based on image content in set of images (402). One example way of determining respective resolutions is described with respect to FIG. 5. For instance, FIG. 5 is a flowchart illustrating an example method of generating a mask for determining respective resolutions of respective cells in a BEV grid.

As illustrated in FIG. 5, one or more processors 110 may determine an attention map of respective ROIs in image content of one or more of the set of images (500). To determine the attention map, one or more processors 110 may determine, based on executing an attention map model, the attention map. In some examples, the attention map model is pretrained using unlabeled training images. As an example, one or more processors 110 may determine an object type of objects in the image content (e.g., based on the attention map). One or more processors 110 may dynamically determine respective cell resolutions of respective cells in the BEV grid based on the object type of objects in the image content in the set of images.

One or more processors 110 may dynamically determine the respective cell resolutions based on the attention map. For example, one or more processors 110 may determine a first set of samples having ROI values, in the attention map, that are greater than or equal a threshold value (502), and determine a second set of samples having ROI values, in the attention map, that are less than the threshold value (504). One or more processors 110 may generate a binary mask based on the first set of samples and the second set of samples (506). One or more processors 110 may determine respective cell resolutions of respective cells in the BEV grid based on the binary mask (508).

Referring back to FIG. 4, one or more processors 110 may be configured to generate BEV image content based on respective resolutions of respective cells (404). One example way of generating BEV image content is described with respect to FIG. 6. For instance, FIG. 6 is a flowchart illustrating an example method of segmentation and fusing.

For example, the respective cells in the BEV grid may include a first cell having a first cell resolution and a second cell having a second cell resolution. The first cell resolution may be greater than the second cell resolution. To generate the BEV image content, one or more processors 110 may be configured to execute a first machine learning model kernel having a first size for object segmentation in the first cell to generate first object information for the first cell (600), and execute a second machine learning model kernel having a second size for object segmentation in the second cell to generate second object information for the second cell (602). In this example, the first size is smaller than the second size. One or more processors 110 may fuse the first object information and the second object information (604).

In accordance with the example techniques, one or more processors 110 may be configured to dynamically adjust (e.g., determine) the cell resolution of the cells of the BEV grid in the BEV space based on regions having higher ROI values. This enables higher-resolution processing for cells containing objects of interest like pedestrians, while using lower resolution for other cells. By incorporating this adaptive grid resolution adjustment, the example techniques may improve the efficiency of semantic segmentation in BEV space without sacrificing segmentation accuracy.

Figure 7:
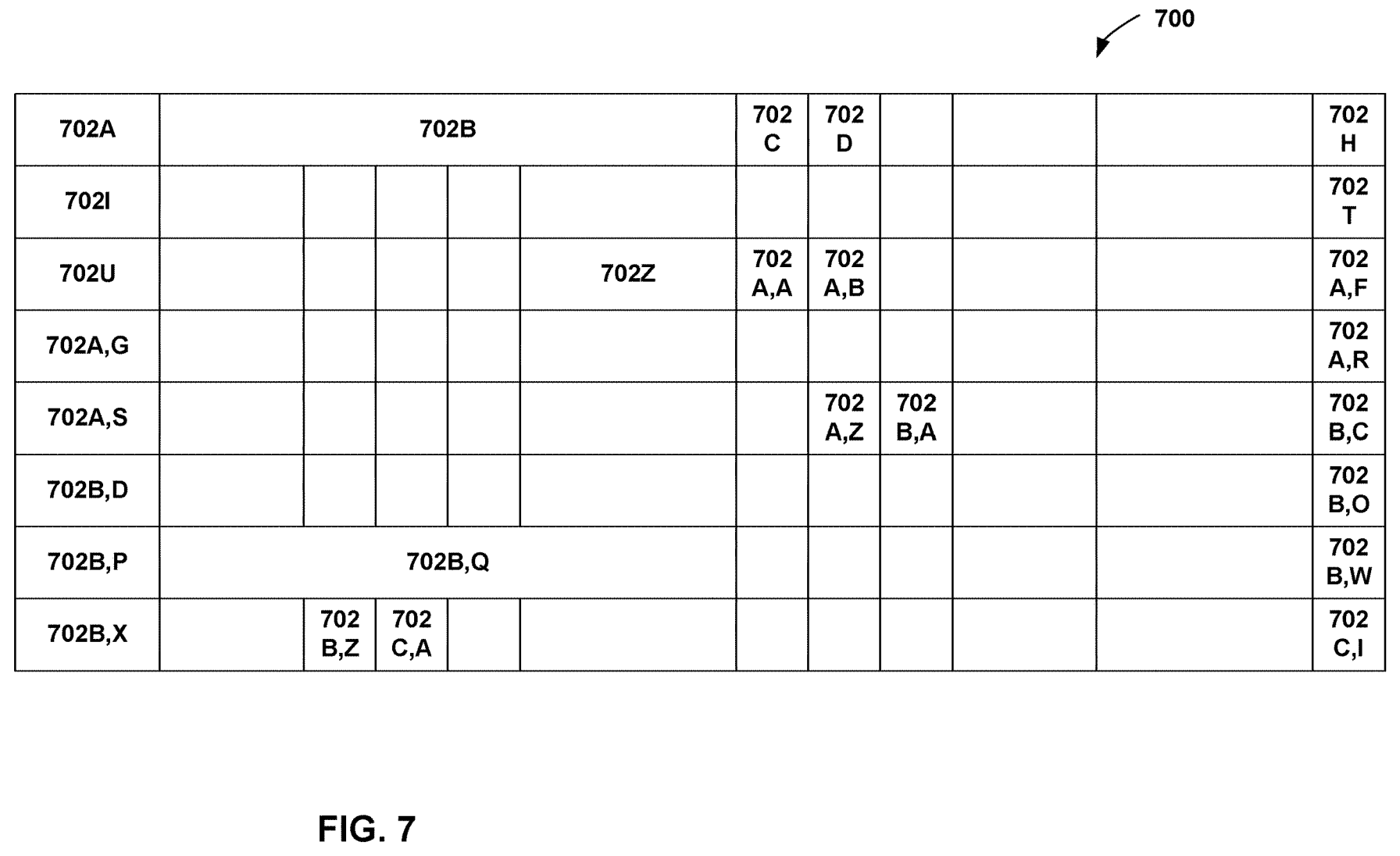

FIG. 7 is a conceptual diagram illustrating an example of a BEV grid with cells having different resolutions. In FIG. 7, BEV grid 700 includes cells 702A to 702C,I. The different sizes of the cells indicates that the cells have different cell resolutions. As one example, cell 702B may be for a sidewalk, whereas cells 702A,Z and 702B,A may be for pedestrians. The larger cells indicate that the cell resolution is lower, and the smaller cells indicate that the cell resolution is higher.

The following numbered clauses illustrate one or more aspects of the devices and techniques described in this disclosure.

Clause 1. A method of image processing, the method comprising: receiving a set of images from a sensor; dynamically determining respective cell resolutions of respective cells in a bird's-eye-view (BEV) grid based on image content in the set of images, wherein at least two of the cells have different cell resolutions; and generating BEV image content based on the respective cell resolutions of the respective cells.

Clause 2. The method of clause 1, further comprising: determining an attention map indicative of respective regions of interest (ROIs) in the image content of one or more of the set of images, wherein dynamically determining the respective cell resolutions comprises dynamically determining the respective cell resolutions based on the attention map.

Clause 3. The method of clause 2, further comprising: determining a first set of samples having ROI values, in the attention map, that are greater than or equal a threshold value; determining a second set of samples having ROI values, in the attention map, that are less than the threshold value; and generating a binary mask based on the first set of samples and the second set of samples, wherein determining respective cell resolutions comprises determining respective cell resolutions based on the binary mask.

Clause 4. The method of any of clauses 2 and 3, wherein determining the attention map comprises determining, based on executing an attention map model, the attention map, and wherein the attention map model is pretrained using unlabeled training images.

Clause 5. The method of any of clauses 1-4, further comprising: determining an object type of objects in the image content, wherein dynamically determining respective cell resolutions comprises dynamically determining respective cell resolutions of respective cells in the BEV grid based on the object type of objects in the image content in the set of images.

Clause 6. The method of any of clauses 1-5, wherein the respective cells in the BEV grid comprises a first cell having a first cell resolution and a second cell having a second cell resolution, wherein the first cell resolution is greater than the second cell resolution, and wherein generating the BEV image content comprises: executing a first machine learning model kernel having a first size for object segmentation in the first cell to generate first object information for the first cell; and executing a second machine learning model kernel having a second size for object segmentation in the second cell to generate second object information for the second cell, wherein the first size is smaller than the second size.

Clause 7. The method of clause 6, further comprising fusing the first object information and the second object information.

Clause 8. The method of any of clauses 1-7, wherein the sensor is one or more of a camera or a LiDAR.

Clause 9. The method of any of clauses 1-8, further comprising: controlling operation of a vehicle based on the BEV image content.

Clause 10. A system for image processing, the system comprising: one or more memories; and processing circuitry coupled to the one or more memories, wherein the processing circuitry is configured to: receive a set of images from a sensor; dynamically determine respective cell resolutions of respective cells in a bird's-eye-view (BEV) grid based on image content in the set of images, wherein at least two of the cells have different cell resolutions; and generate BEV image content based on the respective cell resolutions of the respective cells.

Clause 11. The system of clause 10, wherein the processing circuitry is configured to: determine an attention map indicative of respective regions of interest (ROIs) in the image content of one or more of the set of images, wherein to dynamically determine the respective cell resolutions, the processing circuitry is configured to dynamically determine the respective cell resolutions based on the attention map.

Clause 12. The system of clause 11, wherein the processing circuitry is configured to: determine a first set of samples having ROI values, in the attention map, that are greater than or equal a threshold value; determine a second set of samples having ROI values, in the attention map, that are less than the threshold value; and generate a binary mask based on the first set of samples and the second set of samples, wherein to determine respective cell resolutions, the processing circuitry is configured to determine respective cell resolutions based on the binary mask.

Clause 13. The system of any of clauses 11 and 12, wherein to determine the attention map, the processing circuitry is configured to determine, based on executing an attention map model, the attention map, and wherein the attention map model is pretrained using unlabeled training images.

Clause 14. The system of any of clauses 10-13, wherein the processing circuitry is configured to: determine an object type of objects in the image content, wherein to dynamically determine respective cell resolutions, the processing circuitry is configured to dynamically determine respective cell resolutions of respective cells in the BEV grid based on the object type of objects in the image content in the set of images.

Clause 15. The system of any of clauses 10-14, wherein the respective cells in the BEV grid comprises a first cell having a first cell resolution and a second cell having a second cell resolution, wherein the first cell resolution is greater than the second cell resolution, and wherein to generate the BEV image content, the processing circuitry is configured to: execute a first machine learning model kernel having a first size for object segmentation in the first cell to generate first object information for the first cell; and execute a second machine learning model kernel having a second size for object segmentation in the second cell to generate second object information for the second cell, wherein the first size is smaller than the second size.

Clause 16. The system of clause 15, wherein the processing circuitry is configured to fuse the first object information and the second object information.

Clause 17. The system of any of clauses 10-16, wherein the sensor is one or more of a camera or a LiDAR.

Clause 18. The system of any of clauses 10-17, wherein the processing circuitry is configured to: control operation of a vehicle based on the BEV image content.

Clause 19. Computer-readable storage media comprising instructions that when executed cause one or more processors to: receive a set of images from a sensor; dynamically determine respective cell resolutions of respective cells in a bird's-eye-view (BEV) grid based on image content in the set of images, wherein at least two of the cells have different cell resolutions; and generate BEV image content based on the respective cell resolutions of the respective cells.

Clause 20. The computer-readable storage media of clause 19, further comprising instructions that cause the one or more processors to perform the method of any of clauses 2-9.

Clause 21. A system comprising: means for receiving a set of images from a sensor; means for dynamically determining respective cell resolutions of respective cells in a bird's-eye-view (BEV) grid based on image content in the set of images, wherein at least two of the cells have different cell resolutions; and means for generating BEV image content based on the respective cell resolutions of the respective cells.

Clause 22. The system of clause 21, further comprising means for performing the method of any of clauses 2-9.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, the method comprising: receiving a set of images from a sensor;

determining an attention map indicative of respective regions of interest (ROIs) in image content of one or more of the set of images, dynamically determining respective cell resolutions of respective cells in a bird's-eye-view (BEV) grid based on image content in the set of images and based on the attention map, wherein at least two of the cells have different cell resolutions; and generating BEV image content based on the respective cell resolutions of the respective cells.

2. The method of claim 1, further comprising:

determining a first set of samples having ROI values, in the attention map, that are greater than or equal a threshold value;

determining a second set of samples having ROI values, in the attention map, that are less than the threshold value; and generating a binary mask based on the first set of samples and the second set of samples, wherein determining respective cell resolutions comprises determining respective cell resolutions based on the binary mask.

3. The method of claim 1, wherein determining the attention map comprises determining, based on executing an attention map model, the attention map, and wherein the attention map model is pretrained using unlabeled training images.

4. The method of claim 1, further comprising:

determining an object type of objects in the image content, wherein dynamically determining respective cell resolutions comprises dynamically determining respective cell resolutions of respective cells in the BEV grid based on the object type of objects in the image content in the set of images.

5. The method of claim 1, wherein the respective cells in the BEV grid comprises a first cell having a first cell resolution and a second cell having a second cell resolution, wherein the first cell resolution is greater than the second cell resolution, and wherein generating the BEV image content comprises:

executing a first machine learning model kernel having a first size for object segmentation in the first cell to generate first object information for the first cell; and executing a second machine learning model kernel having a second size for object segmentation in the second cell to generate second object information for the second cell, wherein the first size is smaller than the second size.

6. The method of claim 5, further comprising fusing the first object information and the second object information.

7. The method of claim 1, wherein the sensor is one or more of a camera or a LiDAR.

8. The method of claim 1, further comprising:

controlling operation of a vehicle based on the BEV image content.

9. A system for image processing, the system comprising:

one or more memories; and processing circuitry coupled to the one or more memories, wherein the processing circuitry is configured to:

receive a set of images from a sensor;

determine an attention map indicative of respective regions of interest (ROIs) in image content of one or more of the set of images, dynamically determine respective cell resolutions of respective cells in a bird's-eye-view (BEV) grid based on image content in the set of images and based on the attention map, wherein at least two of the cells have different cell resolutions; and generate BEV image content based on the respective cell resolutions of the respective cells.

10. The system of claim 9, wherein the processing circuitry is configured to:

determine a first set of samples having ROI values, in the attention map, that are greater than or equal a threshold value;

determine a second set of samples having ROI values, in the attention map, that are less than the threshold value; and generate a binary mask based on the first set of samples and the second set of samples, wherein to determine respective cell resolutions, the processing circuitry is configured to determine respective cell resolutions based on the binary mask.

11. The system of claim 9, wherein to determine the attention map, the processing circuitry is configured to determine, based on executing an attention map model, the attention map, and wherein the attention map model is pretrained using unlabeled training images.

12. The system of claim 9, wherein the processing circuitry is configured to:

determine an object type of objects in the image content, wherein to dynamically determine respective cell resolutions, the processing circuitry is configured to dynamically determine respective cell resolutions of respective cells in the BEV grid based on the object type of objects in the image content in the set of images.

13. The system of claim 9, wherein the respective cells in the BEV grid comprises a first cell having a first cell resolution and a second cell having a second cell resolution, wherein the first cell resolution is greater than the second cell resolution, and wherein to generate the BEV image content, the processing circuitry is configured to:

execute a first machine learning model kernel having a first size for object segmentation in the first cell to generate first object information for the first cell; and execute a second machine learning model kernel having a second size for object segmentation in the second cell to generate second object information for the second cell, wherein the first size is smaller than the second size.

14. The system of claim 13, wherein the processing circuitry is configured to fuse the first object information and the second object information.

15. The system of claim 9, wherein the sensor is one or more of a camera or a LiDAR.

16. The system of claim 9, wherein the processing circuitry is configured to:

control operation of a vehicle based on the BEV image content.

17. Computer-readable storage media comprising instructions that when executed cause one or more processors to:

receive a set of images from a sensor;

determine an attention map indicative of respective regions of interest (ROIs) in image content of one or more of the set of images, dynamically determine respective cell resolutions of respective cells in a bird's-eye-view (BEV) grid based on image content in the set of images and based on the attention map, wherein at least two of the cells have different cell resolutions; and generate BEV image content based on the respective cell resolutions of the respective cells.

18. The computer-readable storage media of claim 17, further comprising instructions that cause the one or more processors to control operation of a vehicle based on the BEV image content.

* * * * *